J. H. HAMMOND, Jr.
AUTOMATIC GUIDE LIGHT FOR VESSELS.
APPLICATION FILED AUG. 14, 1913. RENEWED NOV. 17, 1916.
1,274,265.
Patented July 30, 1918.
4 SHEETS—SHEET 1.
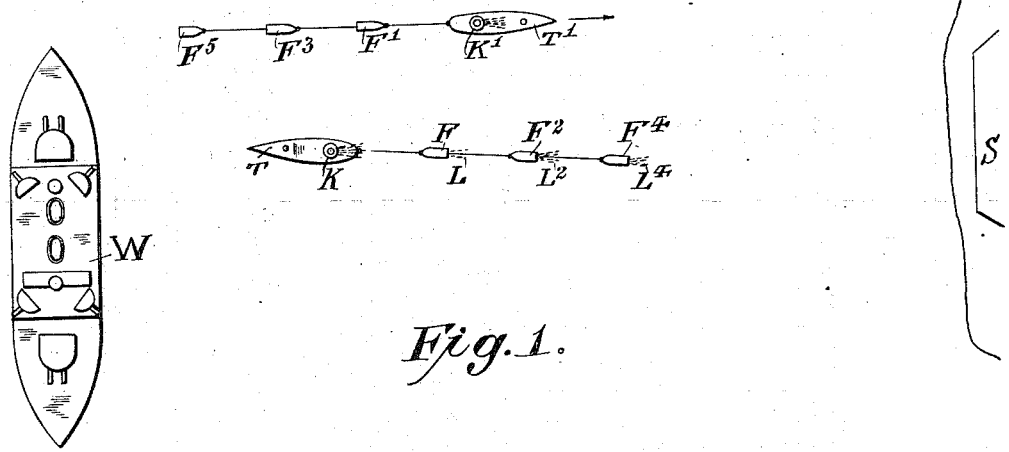
Fig. 1.
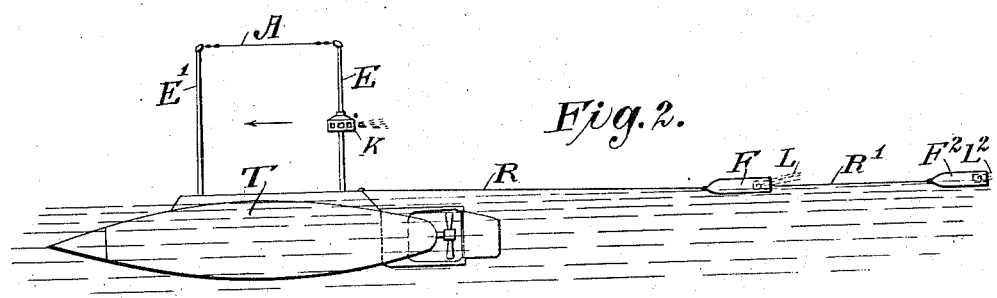
Fig. 2.
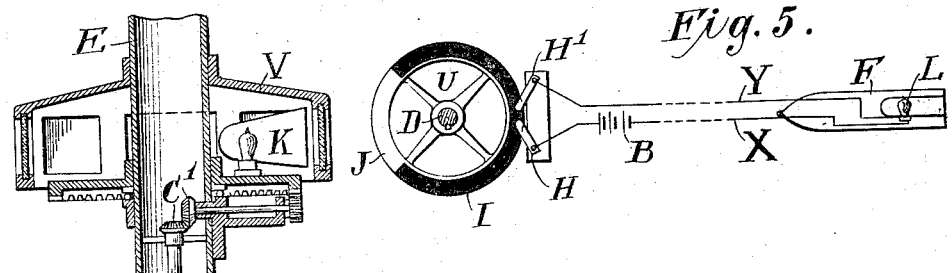
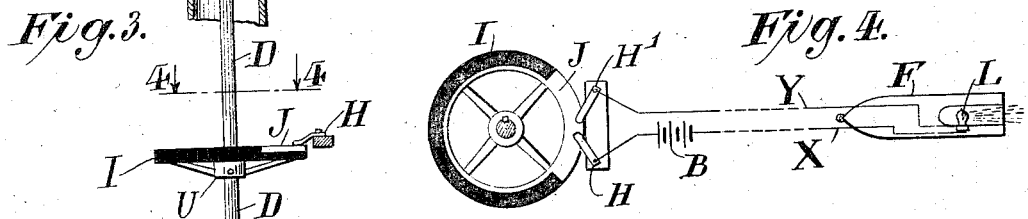
Fig. 3.       Fig. 4.       Fig. 5.
WITNESSES
INVENTOR
ATTORNEYS J. H. HAMMOND, Jr.
AUTOMATIC GUIDE LIGHT FOR VESSELS.
APPLICATION FILED AUG. 14, 1913. RENEWED NOV. 17, 1916.
1,274,265.
Patented July 30, 1918.
4 SHEETS—SHEET 2.
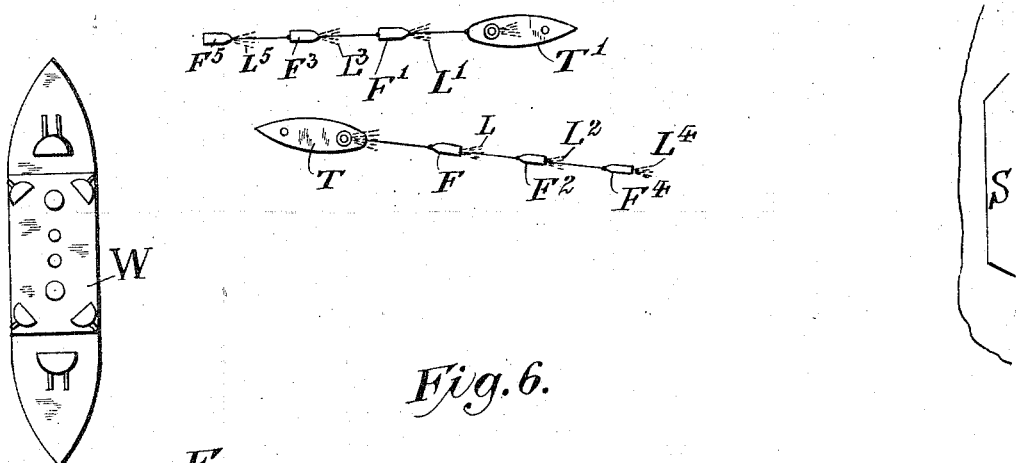
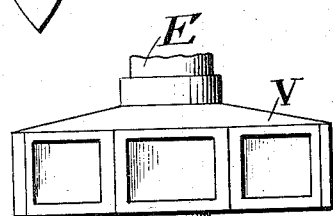
Fig. 6.
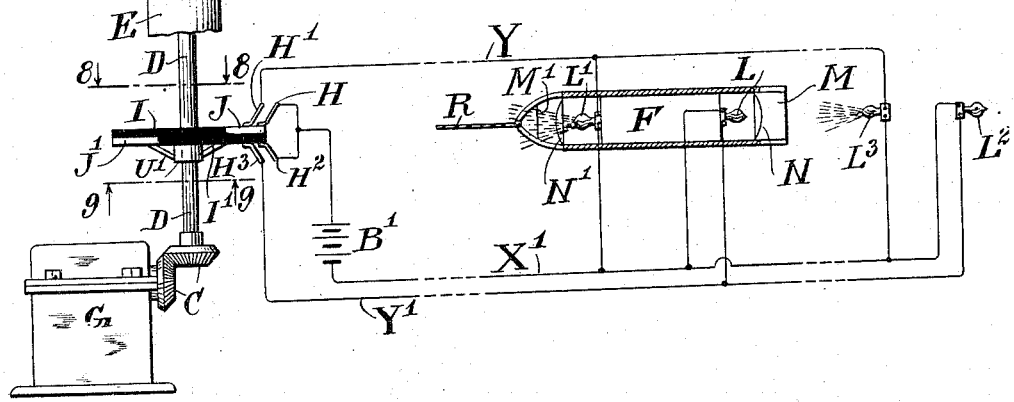
Fig. 7.   Fig. 7a
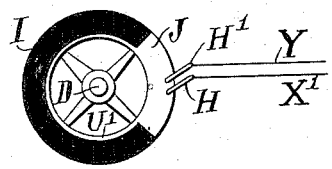
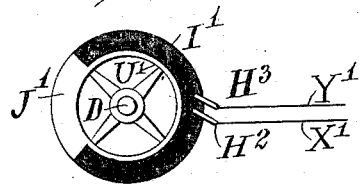
Fig. 8.   Fig. 9.
WITNESSES
INVENTOR
ATTORNEYS

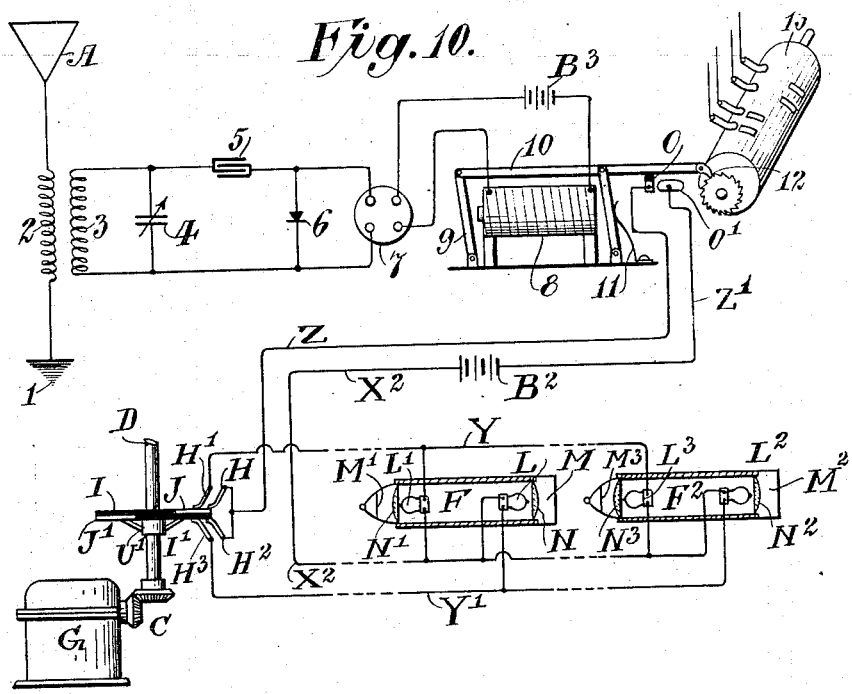
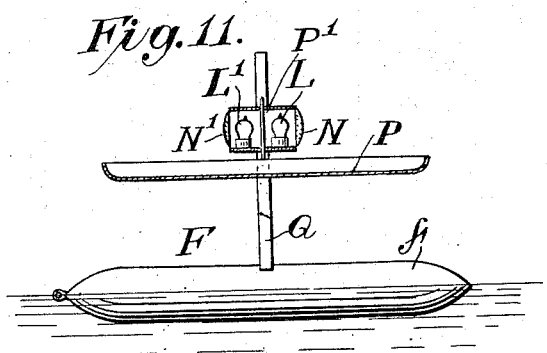
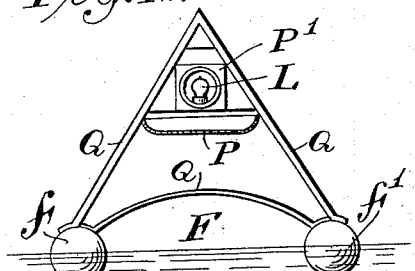

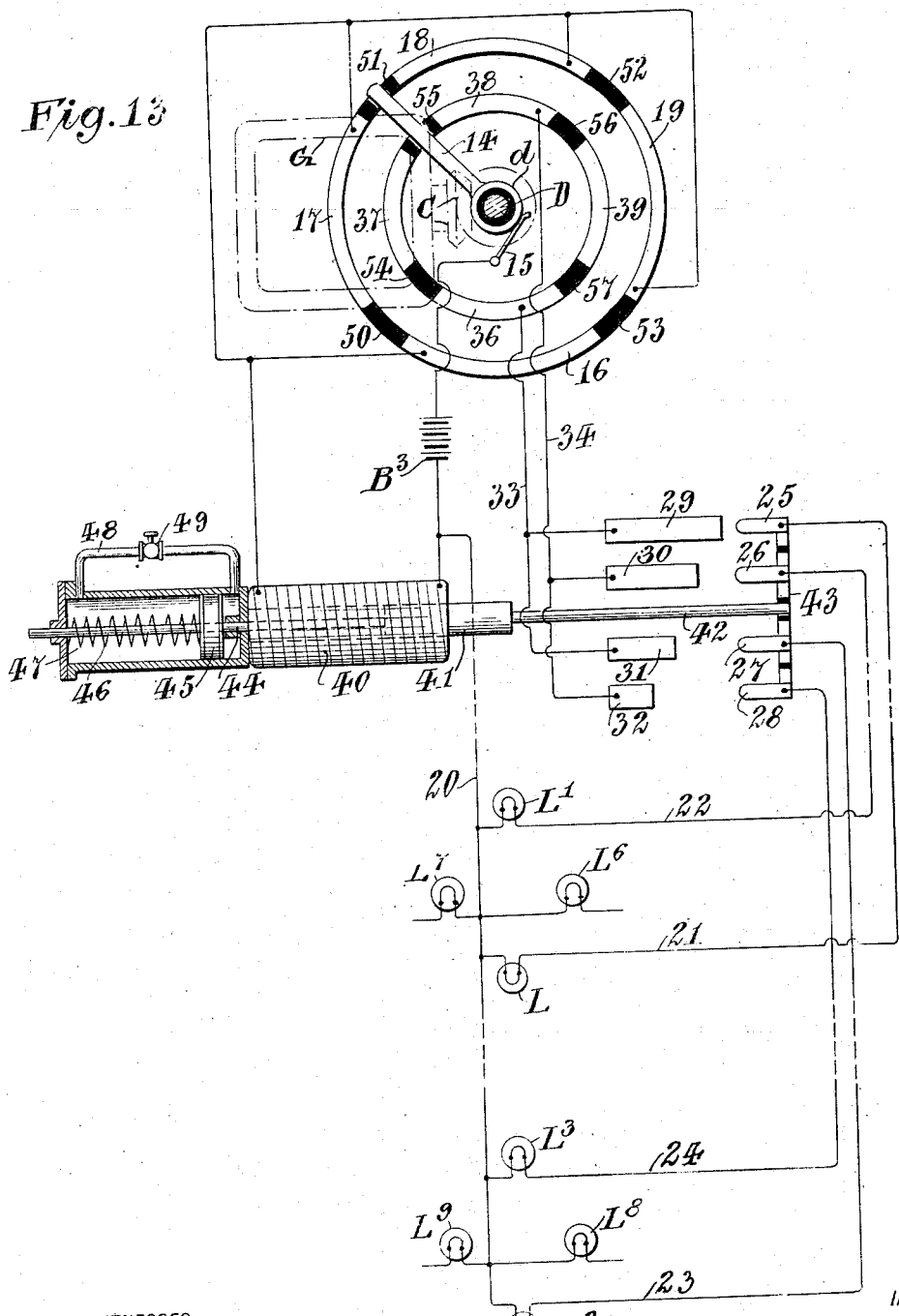

UNITED STATES PATENT OFFICE.

JOHN HAYS HAMMOND, JR., OF GLOUCESTER, MASSACHUSETTS.

AUTOMATIC GUIDE-LIGHT FOR VESSELS.

1,274,265.    Specification of Letters Patent.    Patented July 30, 1918.

Application filed August 14, 1913, Serial No. 784,689. Renewed November 17, 1916. Serial No. 131,958.

*To all whom it may concern:*

Be it known that I, JOHN HAYS HAMMOND, Jr., a citizen of the United States, residing in Gloucester, in the State of Massachusetts, have invented certain new and useful Improvements in Automatic Guide-Lights for Vessels, of which the following is a specification.

My invention relates to guides and particularly lights which are used to guide a vessel controlled from a distance, and relates more particularly to lights on floats or other vessels which are towed by torpedoes, torpedo boats and similar craft controlled from a distance either by wire or by radiant energy. These lights are to be invisible to an enemy, but are to be visible to observers at the station, either on shore or on another vessel, from which the movements of the said torpedoes or similar craft are controlled and directed.

In the accompanying drawing, I have represented that embodiment of my invention involving the use of guidelights, though I am not restricted thereto, the scope of the invention being pointed out in the claims.

In the accompanying drawings,

Figure 1 shows, partly in diagrammatic form, a warship and a torpedo with floats in tow.

Fig. 2 shows a torpedo with a guide light and with floats in tow.

Fig. 3 shows, partly in section, a mast, guide light, and mechanism on a torpedo or similar craft.

Figs. 4 and 5 show, partly diagrammatically, a switch or commutator and brushes on a torpedo and a float with a light.

Fig. 6 shows, partly diagrammatically, a warship and a torpedo with floats in tow having a modified form of lights.

Fig. 7 shows, partly diagrammatically, mechanism on a torpedo, and a modified form of lights on floats.

Fig. 7$^a$ shows an end view of a mirror for a light on one of my floats.

Figs. 8 and 9 show, respectively, top and bottom views of a double commutator or switch on one of my torpedoes.

Fig. 10 shows, in diagrammatic form, radio receiving apparatus and other mechanisms on a torpedo, and floats with lights.

Fig. 11 shows a side view of one form of my floats with lights.

Fig. 12 shows an end view of such a float with lights.

Fig. 13, shows, diagrammatically, a modified form of my system of towing guide lights.

In Fig. 1, S is a shore station containing radio transmitting apparatus for controlling the movements of torpedoes or similar craft, W is a warship, T is a torpedo or similar craft controlled from the shore station and advancing toward the warship, with floats F, F$^2$ and F$^4$ in tow. K is a guide light on the torpedo, and L, L$^2$ and L$^4$ are guide lights on the floats. T' is the same or a similar torpedo returning from the warship, with the same or similar floats F', F$^3$ and F$^5$ in tow, and K' is the same or a similar guide light on torpedo T'.

In Fig. 2, T is a torpedo, or similar craft, with masts E and E', antenna A, and guide light K, and with a tow line or cable R R' for towing the floats F and F$^2$ having guide lights L and L$^2$, respectively.

In Fig. 3, E is a hollow mast on one of my torpedoes, or similar craft, G represents a casing adapted to contain a gyroscope and any well-known mechanism controlled thereby, which mechanism is connected in any suitable manner with the bevel gearing C. The rotatable vertical rod or shaft D connects bevel gearing C with bevel gearing C', and the latter is connected by means of suitable mechanisms with the guide light K, so that the rays from light K are emitted constantly in one direction, as fully described in my application for U. S. Letters Patent No. 756,273. Attached to the mast E is a frame V with openings or windows, within which light K revolves. Attached to the shaft D and turning with it is a switch or commutator U, having a rim composed partly of insulating material I and partly of conducting material J. Brush H, which is rigidly attached to the torpedo, bears on this rim.

In Figs. 4 and 5, U is a switch or commutator attached to the shaft D on a torpedo and having a rim composed partly of insulating material I and partly of conducting material J. Brushes H and H', rigidly attached to the torpedo, bear on the rim of the commutator. A battery or other source of current, B, is connected by means of the insulated conductors X and Y, the brushes H and H' and the commutator U with the guide light L on the float F. The conductors X and Y are preferably carried by the towline or cable R shown in Fig. 2, or they may form part of said cable.

In Fig. 4, the brushes H and H' are shown bearing on the conducting part J of the commutator, so that current flows from the battery or generator B through the lamp L. In Fig. 5, the brushes are shown bearing on the insulating part I of the commutator, so that no current flows through the lamp L. The segments I and J of the commutator rim are so arranged that the lamp L, and similar lamps $L^2$ and $L^4$ on other floats $F^2$ and $F^4$, in Fig. 1, will be lighted only when the torpedo is heading toward the warship W and away from the station S, and will be out when the torpedo is headed in any other direction, so that these guide lights will enable the observer at the station S to direct the torpedo toward the warship, and if the warship should be missed and the torpedo have to be brought back, or if for any other reason it should be necessary to turn the torpedo, these guide lights will go out and will not betray the presence of the torpedo to the enemy.

In Fig. 6, S is a shore station, containing radio transmitting apparatus for controlling the movements of torpedoes or similar craft, W is a warship, T is a torpedo, or similar craft, controlled from the shore station and advancing toward the warship W, and towing floats F, $F^2$ and $F^4$. L, $L^2$ and $L^4$ are rear guide lights on the floats F, $F^2$ and $F^4$, respectively. T' is the torpedo returning toward the shore station, and F', $F^3$ and $F^5$ show the towed floats in this new position, with forward guide lights L', $L^3$ and $L^5$.

In Fig. 7, E is a hollow mast on one of my torpedoes or similar craft, G is a casing containing a gyroscope and any well-known mechanism controlled thereby, which mechanism is connected in any suitable manner with the bevel gearing C. The rotatable vertical rod or shaft D is attached to the bevel gearing C, and at its upper end is suitably connected with a guide light which revolves inside the frame V, which has openings or windows. Attached to the shaft D and turning with it is the double commutator or switch U' having an upper rim and a lower rim. The upper rim has an insulating part I and a conducting part J. The lower rim has an insulating part I' and a conducting part J'. Brushes H and H', which are rigidly attached to the torpedo, bear on the upper rim, and brushes $H^2$ and $H^3$, which are also rigidly attached to the torpedo, bear on the lower rim. F is a float, connected by a towline R with the torpedo, and carrying the rear light L and the forward light L'. N and N' are lenses for concentrating and directing the rays from the lights L and L', respectively. M and M' are mirrors, with reflecting surfaces on both sides, for the purpose of reflecting the light from L and from L', respectively, in such a way that if the float is not moving in a direct line from or toward the controlling station, the observer there will still be able to see light L or light L'. $L^2$ and $L^3$ are lamps on a second float, not shown, towed behind the first float F. A battery B' on the torpedo, is connected with the brushes H and $H^2$, and, by means of the conductor X', with the lamps L, L', $L^2$ and $L^3$. The conductor Y is connected with brush H' and with the lamps L' and $L^3$, and the conductor Y' is connected with the brush $H^3$ and with the lamps L and $L^2$. The position of the switch or commutator U' is controlled by the gyroscope in casing G, and the position of the brushes with reference to the commutator will vary with direction in which the torpedo is pointing. The commutator is so arranged, that when the torpedo is headed toward the warship W and away from the station S, in Fig. 6, brushes $H^2$ and $H^3$ will bear on the conducting part of the lower rim of the commutator, and brushes H and H' will bear on the insulating part of the upper rim of the commutator, so that rear lamps L and $L^2$ will be lighted, and forward lamps L' and $L^3$ will be out, and when the torpedo is headed away from the warship and toward the station, the reverse will take place, as shown in Fig. 7.

In Fig. 7ª M is an end view of the mirror, with reflecting surfaces on both sides, shown in side view in Fig. 7. Mirror M' is similar to M.

In Fig. 8, U' is a switch or commutator, the upper rim of which is here shown, I being the insulating part of the rim, and J being the conducting part of the rim. H and H' are brushes and X' and Y are conductors leading to a battery and lamps, shown in Fig. 7.

In Fig. 9, U' is a switch or commutator, the lower rim of which is here shown, I' being the insulating part of the rim, and J' being the conducting part of the rim. $H^2$ and $H^3$ are brushes, and X' and Y' are conductors leading to a battery and lamps, shown in Fig. 7.

In Fig. 10, A is an antenna on the torpedo, grounded at 1 through an inductance coil 2, which is coupled with the tuned oscillatory circuit 3, 4, comprising the inductance coil 3 and the variable condenser 4. By means of a stopping condenser 5 and rectifier 6, current impulses are supplied to the relay 7, which, when actuated, allows current to flow from the battery $B^3$ through the electromagnet 8. When the electromagnet 8 is energized, it causes commutator 13 to rotate by means of armature 9, rod 10 and pawl 12. Attached to rod 10 is a contact piece O, which makes contact with a fixed piece O' whenever electromagnet 8 is energized, that is to say, whenever signals are received by the radio receiving apparatus. Spring 11 causes armature 9, rod 10 and pawl 12 to return to their original position, and the connection between contacts O and O' to be broken, when electromagnet 8 is deenergized. G is a casing containing a gyroscope and any well-known mechanism controlled thereby, which mechanism is connected in any suitable manner with the bevel gearing C. The rotatable vertical rod or shaft D is attached to the bevel gearing C. Attached to the shaft D and turning with it is the double switch or commutator U', having an upper rim and a lower rim, each rim having an insulated part and a conducting part. I is the insulated part and J the conducting part of the upper rim; I' is the insulated part and J' the conducting part of the lower rim. H and H' are fixed brushes bearing on the upper rim of commutator U', and $H^2$ and $H^3$ are fixed brushes bearing on the lower rim of commutator U'. Battery $B^2$, on the torpedo, or similar craft, is connected by the conductor Z' with fixed contact piece O', and is connected by the conductor $X^2$ with the lamps L and L' on float F, and $L^2$ and $L^3$, on float $F^2$. Brushes H and $H^2$ are connected by means of conductor Z with movable contact O. Brush H', by means of conductor Y, is connected with lamps L' and $L^3$, and brush $H^3$, by means of conductor Y', is connected with lamps L and $L^2$. Mirrors M, M', $M^2$ and $M^3$ are attached to the floats F and $F^2$, for the purpose of reflecting the light from lamps L, L', $L^2$ and $L^3$, respectively, as described in connection with Figs. 7 and $7^a$. N, N', $N^2$ and $N^3$ are lenses for the lights L, L', $L^2$ and $L^3$, respectively.

By means of the double switch or commutator U', and the brushes H, H', $H^2$ and $H^3$, also shown in Figs. 7, 8 and 9, the circuit through battery $B^2$ and lamps L and $L^2$ can be completed and the lamps lighted only when the torpedo and the towed floats are moving away from the observer at the controlling station, and they will then be visible to this observer, but will be invisible to the enemy toward whom they are moving. The circuit through the battery $B^2$ and the lamps L' and $L^3$ can be completed and the lamps lighted only when the torpedo and the floats are moving toward the controlling station, and they will then be visible to this station, but invisible to the enemy from whom they are moving away.

By means of the contacts O and O', the lighting circuits will be under the control of the observer at the controlling station, and will be closed only when impulses are sent and the electromagnet 8 is energized. In this way, the lamps on the floats will be lighted only when the observer wishes to see them, and can be lighted only in certain predetermined positions of the torpedo, as above described. The guide lights on the floats, together with the guide light on the torpedo, or other towing craft, will enable the observer at the controlling station to direct the movements of the torpedo with great accuracy.

In Figs. 11 and 12, F is a float carrying lamps L and L', f and f' are two hulls, fastened together by pieces Q, Q, Q, N and N' are lenses for lamps L and L', respectively, P is a horizontal screen for preventing the rays from the lamps from striking the water and so betraying the presence of the floats and torpedo to the enemy, and P' is a vertical screen between the lamps so as to prevent lamp L from sending its rays ahead, and to prevent lamp L' from sending its rays astern.

In Fig. 13, a rotatable conducting arm 14 is mechanically connected with the gyroscope in casing G by means of the ring d, the rod or shaft D and the bevel gearing C, and so maintains a fixed azimuth when the gyroscope is in operation. An outer ring or conducting segments 16, 17, 18 and 19 with insulating segments 50, 51, 52 and 53, and an inner ring of conducting segments 36, 37, 38 and 39 with insulating segments 54, 55, 56 and 57, are fixed to the torpedo or other vessel and turn with it, the conducting segments making contact successively, with the arm 14. The ring d is mechanically connected with the shaft D, but insulated therefrom, and is both electrically and mechanically connected with the arm 14. A brush 15 bears against the ring d and is connected by means of the conductor 35 with one pole of the battery or other source of current, $B^3$, the other pole of which is connected with one terminal of the electromagnet 40, and also, by means of the insulated conductor or cable 20, with lights L, $L^1$, $L^6$ and $L^7$ on one towed float and with lights $L^2$, $L^3$, $L^8$ and $L^9$ on a second towed float. Insulated conductors 21, 22, 23, and 24, preferably in the same cable with conductor 20, connect lights L, L', $L^2$ and $L^3$ with movable contacts 25, 26, 27 and 28, respectively. The movable contacts 25, 26, 27 and 28 are attached to a movable arm 43, but insulated therefrom, and the arm 43 is connected by means of the bar or rod 42 with the plunger 41 of the electromagnet 40. One terminal of the electromagnet, as before mentioned, is connected with the battery $B^3$, and the other terminal is connected with all four segments 16, 17, 18 and 19. The core or plunger 41 is connected by the rod 44 with the piston 45, which travels in the cylinder 47. Compression spring 46 opposes the movement of piston 45 and plunger 41 to the left, and restores them to their original position when the electromagnet is deenergized. A pipe 48 connects the two ends of cylinder 47, and in said pipe is an adjustable valve 49 which permits air to flow freely from the right end to the left end of cylinder 47, but which retards the flow of air, to any degree desired, from the left end to the right end of the cylinder. The piston 45, plunger 41 and movable arm 43 will therefore move slowly to the left when the electromagnet is energized, but will move very quickly to the right when the electromagnet is deënergized.

The fixed contacts 29, 30, 31 and 32 are opposite the movable contacts 25, 26, 27 and 28, respectively, but at increasing distances therefrom, as shown in the drawing. Contacts 29 and 30 are connected, by means of conductor 33, with segment 36, and contacts 30 and 32 are connected, by means of conductor 34 with segment 38.

The operation of this device is as follows: The rotatable arm 14 is shown on the insulated segments 51 and 55 between the conducting segments 17 and 18, and the conducting segments 37 and 38. When said arm is in this position, the electromagnet will be deënergized and the lights on the floats will be out. If now, arm 14 turns to the right, or rather, if the vessel turns to the left, arm 14 will make contact with conducting segments 18 and 38. When it makes contact with 18, the circuit through battery B³ and electromagnet 41 will be completed, the electromagnet will be energized, the plunger 41 will be drawn slowly to the left, and the arm 43 will likewise be drawn to the left, and contacts 25, 26, 27, and 28 will make contact, successively, with contacts 29, 30, 31 and 32. Contacts 29 and 31 being connected with segment 36, no circuit will be completed through them with rotatable arm 14 in its new position, but as contacts 30 and 32 are connected with segment 38, circuits will be completed through them, arm 14, battery B³ and forward lights L' and L³. It will be seen, however, that the circuit through contact 30 and light L', on the first float, will be completed before the circuit through contact 32 and light L³, on the second float.

By this arrangement, when the torpedo turns, and the gyroscope-controlled arm 14 makes contact for the forward light circuits, enough time elapses before these circuits are completed to allow each float, in order, to turn far enough before its lamp is lighted, to prevent its light from being visible to the enemy.

When the rotatable arm 14 reaches conducting segment 36, the stern lights L and L² will be lighted in succession by means of the movable contacts 25 and 27 and fixed contacts 29 and 31.

The lights L and L² are stern lights, L' and L³ are forward lights, L⁶ and L⁷ are starboard lights, and L⁷ and L⁹ are port lights. These starboard and port lights may be connected through movable contacts similar to 25, 26, 27 and 28, or otherwise, with segments 39 and 37, respectively, but the circuits are not shown, in order to avoid confusion.

If starboard and port lights are used, they should be suitably screened so as to limit their arc of illumination, as is the case with the bow and stern lights also.

By the means described, whether the bow lights, stern lights or side lights, the light on the first float is lighted first, the light on the second float next, and so on, so that ample time is given for the floats to turn and get in line with the torpedo or other towing vessel before the lights are lighted, and so avoid betraying their presence to the enemy.

The electromagnet or solenoid 40 may be made to operate with any desired speed, and this speed should be regulated according to the turning radius and speed of the torpedo. The resistance of the electromagnet, when it is in a shunt circuit to the lighting circuit, as shown, should be such that ample current will flow through the lights on the floats. The electromagnet may, however, be in an entirely independent circuit, with a separate battery or other source of current.

The gyroscope in casing G is set so that when it is in operation it will hold the light K in such a position that its rays are directed toward the controlling station.

I may use any convenient number of floats, and the floats may be constructed and arranged in any suitable manner. The lights on my torpedo and on my floats are preferably electric incandescent lamps, but any other suitable lights may be used. The switches or commutators and other details of the apparatus may be altered as found suitable in any given case, and, in general, I do not confine myself to the particular apparatus and mechanisms here shown, but various changes and modifications, within the knowledge of those skilled in the art, may be made in the particular apparatus shown and described herein, without departing from the spirit of my invention. provided the means set forth in the following claims be employed.

Having thus described my invention, what I claim is:

1. A system of guides for a vessel and a float or floats towed thereby, comprising a guide on the vessel, means to direct the guide in a fixed direction, a guide on each float, and means to control said float guide or guides to allow the same to act as guides only when the float carrying such guide is pointed in a predetermined direction.

2. A system of guides for a vessel and a float or floats towed thereby, comprising a guide on the vessel, means to direct the guide in a fixed direction, a guide on each float, and means to control said float guide or guides to allow the same to act as guides only when said vessel is pointed in a predetermined direction.

3. A system of guides for a vessel and a float or floats towed thereby, comprising a guide light on the vessel, means to direct the said light in a fixed direction, a source of light on each float, and means to control said source of light to allow the same to emit light only when the float carrying the light is pointed in a predetermined direction.

4. A system of guidelights for a vessel and a float or floats towed thereby, comprising a guidelight on the vessel, means to direct the light in a fixed direction, a source of light on each float, and means to control said source of light to allow the same to emit light only when the vessel is pointed in a predetermined direction.

5. A system of distance control for a vessel and a float or floats towed thereby, comprising a gyroscope to maintain a fixed azimuth, a guidelight on the vessel controlled by said gyroscope, and a source of light on each float controlled by said gyroscope.

6. A system of distance control for a vessel and a float or floats towed thereby comprising a gyroscope which maintains a fixed azimuth, a guide on said vessel controlled by said gyroscope and a guide upon each float controlled by said gyroscope.

7. A system of distance control for vessels and a float or floats towed thereby comprising receiving apparatus for radiant energy upon said vessel, a source of light on said vessel, and means to direct said light in a fixed direction, a source of light on each float, and means for causing said sources of light to emit light only when radiant energy is received by said receiving apparatus.

8. A system of guidelights for vessels and a float or floats towed thereby comprising a gyroscope upon said vessel which maintains a fixed azimuth, a source of light on said vessel controlled by said gyroscope, a switch controlled by said gyroscope, a source of electric current, and lamps carried by said floats electrically connected with said source of current and said switch.

9. A system of guidelights for a vessel and a float or floats towed thereby comprising a guidelight on said vessel, means to direct said light in a fixed direction, a forward lamp and a rear lamp upon each float, and means for causing said forward lamps to be lighted when the vessel is moving in one direction and said rear lights to be lighted when the vessel is moving in the opposite direction.

10. A system of guidelights for a vessel and a float or floats towed thereby comprising a guidelight on said vessel, automatically actuated means to direct said light in a fixed direction, a source of light on each float and a switch on said vessel operated by said automatic means for controlling the lights on said floats.

11. In a system of guidelights for a vessel and a float or floats towed thereby comprising a guidelight on said vessel, receiving apparatus for radiant energy on said vessel, and means to direct said light in a fixed direction, sources of light on each float, and means for causing the lights on the floats to be lighted successively beginning with that on the float nearest the towing vessel.

12. A system of guides for a vessel and a float or floats towed thereby comprising a receiving apparatus for radiant energy on said vessel, a guide on said vessel, means for automatically causing said guide to function in a fixed direction, a guide upon each float, and means for causing the guides on the floats to function successively beginning with that on the float nearest the towing vessel.

13. A system of guidelights for a vessel and a float or floats towed thereby comprising a guidelight on the vessel, automatic means to direct said light in a fixed direction, a source of light on such float, and means for causing said lights to be lighted in succession.

14. A system of distance control for a vessel and a float or floats towed thereby comprising a guide on said vessel, automatic means for causing said guide to function in a fixed direction, a guide on each float, and means for causing said float guides to function in succession.

15. A system of guidelights for a vessel and a float or floats towed thereby comprising a light upon each float, and automatic means on said vessel for lighting said lights, and means for causing said lights to be lighted successively, beginning with that on the float nearest the vessel.

16. A system of guides for a vessel and a float or floats towed thereby comprising a guide upon each float and automatic means upon said vessel for causing said guides to function successively, beginning with that on the float nearest the vessel.

17. A system of control comprising a main movable body, a subsidiary body movable with respect to said main body, a main element mounted on said main body and movable with respect thereto, and a subsidiary element mounted on said subsidiary body and controlled by said main element, one of said elements being automatically operative direction maintaining means.

18. A system of control comprising a main movable body, a subsidiary body movable with respect to said main body, a main element mounted on said main body and movable with respect thereto, and a subsidiary element mounted on said subsidiary body and controlled by said main element, one of said elements being a gyroscope.

19. A system of control comprising a main movable body, a subsidiary body movable with respect to said main body, a gyroscope mounted on said main body and movable with respect thereto, and a subsidiary element mounted on said subsidiary body and controlled by said gyroscope.

20. A system of control comprising a main dirigible body, a subsidiary dirigible body movable with respect to said main body, a main element carried by said main body and movable with respect thereto, and a subsidiary element carried by said subsidiary body and controlled by said main element, one of said elements being automatically operative direction maintaining means.

21. A system of control comprising a main dirigible body, a subsidiary dirigible body movable with respect to said main body, automatically operative direction maintaining means carried by said main body and movable with respect thereto, and a subsidiary element carried by said subsidiary body and controlled by said means.

22. A system of control comprising a main dirigible body, a subsidiary dirigible body movable with respect to said main body, a gyroscope carried by said main body and movable with respect thereto, and a subsidiary element carried by said subsidiary body and controlled by said gyroscope.

23. A system of control comprising a main dirigible marine vessel, a subsidiary dirigible marine vessel movable with respect to said main vessel, a main element carried by said main vessel and movable with respect thereto, and a subsidiary element carried by said subsidiary vessel and controlled by said main element, one of said elements being automatically operative direction maintaining means.

24. A system of control comprising a main dirigible marine vessel, a subsidiary dirigible marine vessel movable with respect to said main vessel, a main element carried by said main vessel and movable with respect thereto, and a subsidiary element carried by said subsidiary vessel and controlled by said main element, one of said elements being a gyroscope.

25. A system of control comprising a main dirigible marine vessel, a subsidiary dirigible marine vessel movable with respect to said main vessel, automatically operative direction maintaining means carried by said main vessel and movable with respect thereto, and a subsidiary element carried by said subsidiary vessel and controlled by said means.

26. A system of control comprising a main dirigible marine vessel, a subsidiary dirigible marine vessel movable with respect to said main vessel, a gyroscope carried by said main vessel and movable with respect thereto, and a subsidiary element carried by said subsidiary vessel and controlled by said gyroscope.

27. A system of control comprising a main movable body, a subsidiary body arranged to be moved by and in unison with said main body and movable with respect thereto, a main element mounted on said main body and movable with respect thereto, and a subsidiary element mounted on said subsidiary body and controlled by said main element, one of said elements being automatically operative direction maintaining means.

28. A system of control comprising a main movable body, a subsidiary body arranged to be moved by and in unison with said main body and movable with respect thereto, a gyroscope mounted on said main body and movable with respect thereto, and a subsidiary element mounted on said subsidiary body and controlled by said gyroscope.

29. A system of control comprising a main dirigible body, a subsidiary body movable with respect to said main body, a gyroscope carried by said main body and movable with respect thereto, and a subsidiary element carried by said subsidiary body and controlled by said gyroscope.

30. A system of position revealing devices for a main movable body and one or more subsidiary movable bodies towed by said main body, comprising a position revealing device on said main body, stabilizing means to direct said position revealing device in a fixed direction, the position revealing device on each of said subsidiary bodies, and means controlled by said stabilizing means to cause said position revealing device or devices on said subsidiary body or bodies to function only when the corresponding subsidiary body is pointed along a predetermined line.

31. A system for revealing the position of a main movable body and a subsidiary movable body, comprising a position revealing device upon said main body, stabilizing means arranged to control the functioning of said position revealing device, and a position revealing device upon said subsidiary body and arranged to be controlled by said stabilizing means.

32. A system for revealing the position of a plurality of separately movable bodies, comprising a position revealing device mounted on each of said bodies, and stabilizing means carried by one of said bodies and arranged to control the functioning of said position revealing devices.

33. A system for revealing the position of a plurality of separately movable bodies, comprising a position revealing lamp mounted on each of said bodies, and stabilizing means carried by one of said bodies and arranged to control the functioning of said position revealing lamps.

34. A system for revealing the position of a plurality of separately movable bodies, comprising a position revealing device mounted on each of said bodies, and stabilizing means carried by one of said bodies and arranged to control the functioning of said position revealing devices and to cause each one of said position revealing devices to function as such only when the corresponding movable body is directed along a predetermined line.

35. A system for revealing the position of a plurality of separately movable bodies, comprising a position revealing lamp mounted on each of said bodies, and stabilizing means carried by one of said bodies and arranged to control the functioning of said position revealing lamps and to cause one of said lights to be illuminated only when the corresponding body is directed along a predetermined line.

This specification signed and witnessed this 11th day of August, A. D., 1913.

JOHN HAYS HAMMOND, Jr.

Signed in the presence of—
  FITZ J. BABSON,
  JOHN CUNNINGHAM.